United States Patent [19]
Dickens et al.

[11] Patent Number: 6,110,602
[45] Date of Patent: Aug. 29, 2000

[54] METHOD OF MAKING A THREE-DIMENSIONAL OBJECT

[75] Inventors: Philip Michael Dickens, West Bridgford; Richard James Mackenzie Hague, Nottingham, both of United Kingdom

[73] Assignee: University of Nottingham, United Kingdom

[21] Appl. No.: 09/077,026

[22] PCT Filed: Nov. 21, 1996

[86] PCT No.: PCT/GB96/02874

§ 371 Date: Oct. 26, 1998

§ 102(e) Date: Oct. 26, 1998

[87] PCT Pub. No.: WO97/18933

PCT Pub. Date: May 29, 1997

[30] Foreign Application Priority Data

Nov. 23, 1995 [GB] United Kingdom ................... 9524018

[51] Int. Cl.[7] ........................... B29C 33/00; B29C 35/08; B29C 41/02
[52] U.S. Cl. ..................... 428/542.8; 164/34; 264/219; 264/221; 264/227; 264/308; 264/317; 264/401
[58] Field of Search ..................... 264/219, 227, 264/308, 317, 401, 221; 164/34; 428/542.8

[56] References Cited

FOREIGN PATENT DOCUMENTS

| 573346 | 12/1993 | European Pat. Off. . |
|---|---|---|
| 590957 | 4/1994 | European Pat. Off. . |
| 649691 | 4/1995 | European Pat. Off. . |
| 732181 | 9/1996 | European Pat. Off. . |
| 3121681 | 2/1982 | Germany . |
| WO 9001727 | 2/1990 | WIPO . |

OTHER PUBLICATIONS

PCT/GB97/02874, International Search Report dated Feb. 26, 1997.

*Primary Examiner*—Leo B. Tentoni
*Attorney, Agent, or Firm*—Watts, Hoffmann, Fisher & Heinke, Co., L.P.A.

[57] ABSTRACT

A structure of solid material for use in making an investment casting mold and a method of making it are disclosed. The structure has a plurality of levels of spaced plates arranged such that in plan view the plates define a plurality of adjoining polygonal formations. The method includes solidifying portions of a body of liquid material to provide a first set of spaced plates, solidifying further portions at different levels to provide at least a second set of plates oriented transversely of plates of the first set. Adjacent sets are interconnected along side edges in essentially point connections.

32 Claims, 2 Drawing Sheets

METHOD OF MAKING A THREE-DIMENSIONAL OBJECT

FIELD OF THE INVENTION

This invention concerns a method of making a three-dimensional object, and particularly but not exclusively a method of making an object by stereolithography and especially a method of making a pattern for use in producing a mould.

BACKGROUND OF THE INVENTION

In traditional investment ("lost wax") casting the first stage is to produce a wax pattern facsimile of the finished metal part; this is usually done via a specially built tool. The wax patterns are then mounted onto a wax "tree" that acts as the gating and runner system of the mould. This construction is then repeatedly coated ("invested") with layers of ceramic material—usually up to about eight coats. After "shelling", the wax has then to be removed to leave a mould in which to pour the molten metal. Dewaxing is normally achieved in a steam autoclave, which essentially works as a large pressure cooker heating the construction to a temperature of about 165° C. at about 7 bar pressure. After wax removal in the autoclave, the "green" ceramic shells are fired to burn out the residue wax and to fire the shells into a "real" ceramic. After firing, metal is then poured into the mould to produce the final metal casting.

Investment casting is a good way to produce complex and intricate metal parts of various dimensions in one single operation. However, the cost of tool production to produce the wax patterns is so expensive as to preclude its use for anything but medium to large batch production casting. Prototyping parts by this manner is not cost effective.

In stereolithography, electromagnetic radiation is used to selectively solidify a thermosetting liquid material. The solidification takes place in a number of passes across the material to usually produce a solid structure. Generally a plurality of levels are built up comprising plates of set material, which by varying the curing pattern in adjacent levels can also provide a honeycomb type structure.

The electromagnetic radiation is generally in the form of a laser which moves relatively slowly over the liquid when setting is required but skips over areas where setting is not required. Each level is made by a number of passes of the laser over the liquid material.

The laser usually, but not always, acts on the surface of the resin and cures material at this point to a small depth. With most stereolithography systems, the layer which represents the bottom of the part (as it is building) is cured first. This is then covered with a fresh layer of resin and this is subsequently cured. The final layer to be cured (as it is building) is at the top of the part. The cured material is usually located on an open support which is gradually lowered into a bath of liquid resin.

The stereolithography process is simply producing a series of two dimensional profiles which, when stacked on top of each other can produce a complex three dimensional object. Therefore it is unlimited in the complexity of parts it can produce.

Stereolithography therefore appears a suitable process for producing patterns for investment casting. However, as the materials used in this process are thermoset materials, these do not melt in the steam autoclave but usually expand upon heating. This expansion will generally cause the relatively weak unfired ceramic shell to crack thereby potentially damaging the mould and also the model.

Attempts have been made to use stereolithography to produce patterns with a thin skin surrounding an open structure. Such attempts however have not always proved particularly successful. The criteria required of such a pattern are listed below and to date the structures proposed have not met all these criteria and have tended not to drain successfully nor collapse as required.

Be strong enough to support the part as it is building. Allow full drainage of the part.

Be strong enough to maintain the dimensional stability of the finished part. Give good finish to part surfaces.

Be able to give support through the hydrostatic pressures encountered during shelling.

Be weak enough to collapse during the autoclave process.

SUMMARY OF THE INVENTION

The term "polygonal formation" when used in this specification is to be understood as being a closed polygon with at least three sides, the sides being generally straight though not necessarily wholly straight.

According to the present invention there is provided a method of making an object, the method comprising forming a structure of solid material, the structure comprising a plurality of levels, each level comprising a plurality of spaced plates of material, the plates being arranged such that in plan view edges of the plates define a plurality of adjoining polygonal formations with the sides of each formation defined by plates, at least some of which are in different levels.

Preferably the plates in adjacent levels are joined to each other by their respective edges and/or corners.

Preferably the plates in adjacent levels are joined to each other substantially only by point contact.

The structure preferably comprises a plurality of repeated levels such that a plurality of concentric polygonal formations are provided.

The polygonal formations preferably comprise substantially regular hexagons. The hexagons are preferably defined by plates in three levels. Each level preferably comprises a plurality of spaced discrete parallel plates. The plates in each level are preferably offset relative to plates in adjacent levels by substantially 120°.

The object preferably comprises an outer skin within which the structure is contained.

The plates may be gently curved and/or a feature may be provided in the plates to facilitate bending or collapse thereof.

The structure is preferably formed by selective curing of a material using electromagnetic radiation, and the material desirably comprises a thermosetting liquid.

The structure is preferably formed by stereolithography.

The invention also comprises a method of producing a mould, the method comprising forming a pattern of an item to be cast in the form of an object made by a method according to any of the preceding eight paragraphs, forming a coating around the pattern, and subsequently removing the pattern from within the coating to form a mould.

The pattern is preferably burnt away from the mould, desirably by flash firing with excess oxygen.

Material is preferably provided on the pattern prior to coating to define passages for molten material to be poured into the mould.

The material may be wax which may be removed prior to burning away of the pattern. The removal of the wax is preferably achieved in an autoclave, preferably by steam autoclaving.

The coating preferably comprises a ceramic material which may be applied in a number of layers, and which is subsequently fired.

An embodiment of the present invention will now be described by way of example only, with reference to the accompanying drawings, in which.

DETAILED DESCRIPTION OF THE PREFERRED EMBODIMENT

The drawings show different stages in making a structure 10 by stereolithography. The structure 10 is produced by moving an electromagnetic source such as a laser over a bath of a thermosetting plastic material for a number of passes to selectively cure the plastics material in certain areas. In the present instance the laser is on continuously and is moved relatively slowly over areas where setting of the plastics material is required but otherwise skips over the other areas. In alternative arrangements the laser can be respectively turned on and off.

Figure 1:
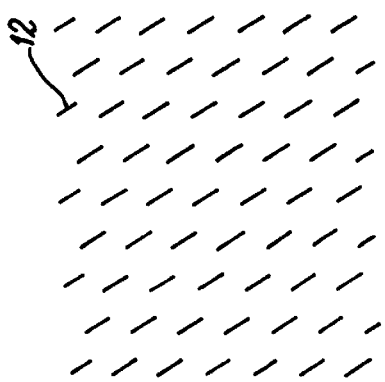

Initially an arrangement of discrete straight lines of set plastics material is formed as shown in FIG. 1. As the laser passes over the bath of thermoplastics material for a number of passes such as for example ten such that the lines 12 are built up to a required height to form plates 13, best seen in FIG. 5. Between each pass a support upon which the cured plastics material is located is moved downwardly by a small increment.

Figure 3:
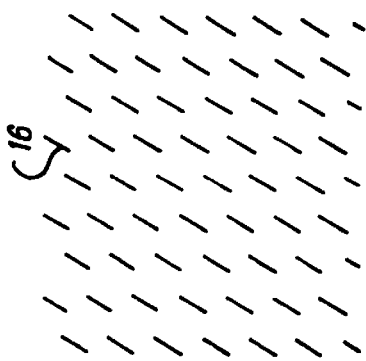
FIGS. 1–3 are diagrammatic plan views of different stages during the making of a structure by a method according to the present invention.
Figure 6:
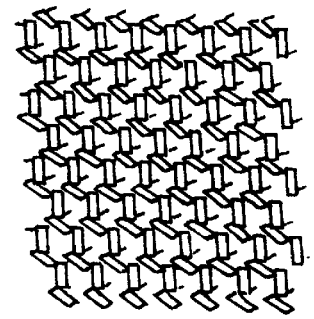
FIG. 6 is a perspective view of the structure.
Figure 2:
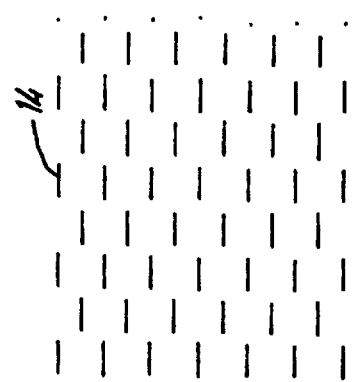
Figure 5:
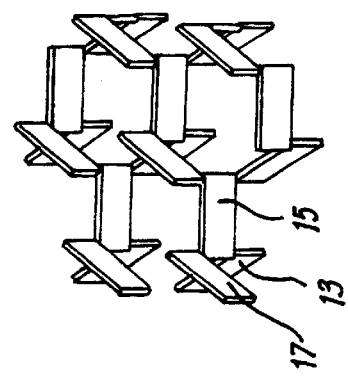
FIG. 5 is an enlarged diagrammatic perspective view of part of the structure.
Figure 4:
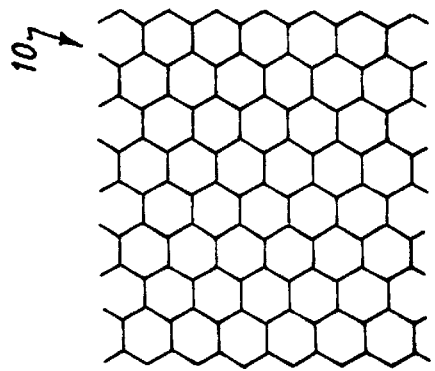
FIG. 4 is a plan view of the structure.

The laser is then caused to pass over the bath of thermosetting material for the same number of passes to provide a similar arrangement of lines 14 except that the arrangement is rotated through 120°. The lines 14 have a similar height to the lines 12 so as to provide plates 15. The laser is then caused to form a further set of lines 16 orientated through a further 120° to provide plates 17. The plates 13,15,17 only connect each other at the respective corners thereof to provide a point contact as shown in FIG. 5. The process of respectively forming the lines 12,14,16 is repeated for the required number of times to provide a structure which in plan view is shown in FIG. 4 comprises a plurality of concentric hexagonal formations but with the three pairs of opposite sides in different levels and being joined only by point contact at the corners of the plates 13,15,17.

The laser can be used to produce the structure, made from a number of formations in any required shape, and a skin of plastics material would generally be provided around the structure 10. The structure 10 would typically be used for producing a pattern of a prototype. The structure can be produced to a required shape with operation of the laser being computer controlled.

Following completion of the structure, wax is attached thereto to define flow paths for molten material into the finished mould. Subsequently a plurality of ceramic coatings are applied onto the structure and wax. Generally the first coating will be of a fine ceramic to provide a smooth inner layer. Subsequent coatings may be made of a rougher material to provide a rough backing. Once sufficient ceramic coatings have been applied the coated structure and wax will be subjected to steam autoclaving, which will melt the wax and cause the structure 10 to collapse. The coating is then subject to flash firing with excess oxygen at approximately 1100°, with 8–9% free oxygen to burn off the plastics material of the structure. The coating can now be used as a mould for casting metals and the like.

The structure of the formation produced by the present invention has a very open internal framework with no acute corners, thereby ensuring that excess liquid plastics material can be drained therefrom. The structure is cost effective as it uses a relatively small amount of plastics material and enables recovery of uncured plastics material by drainage through the open structure for reuse. Also, in view of the only point contact between the plates the formations will distort, buckle and/or collapse during autoclaving due to expansion of the plastics material, thereby preventing any possible cracking of the mould as would occur with a conventional structure.

Figure 7:
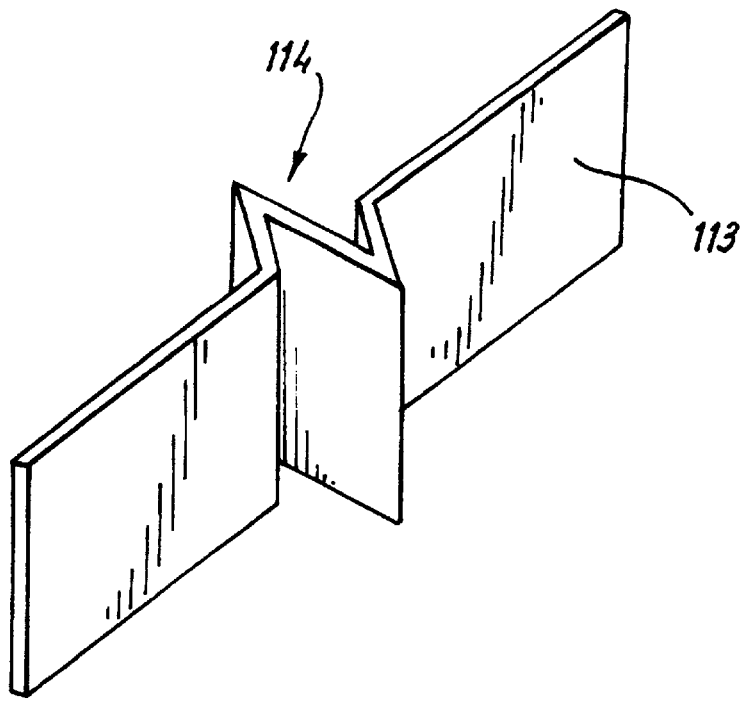
FIGS. 7 and 8 are respective perspective views of components forming parts of two further structures according to the present invention.
Figure 8:
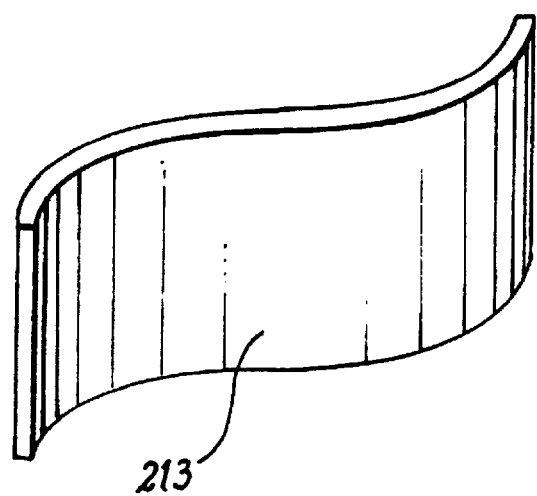

Various modifications may be made without departing from the scope of the invention. For example, the sides which form the hexagons need not be straight, and for instance, a gentle curve could be provided. FIGS. 7 and 8 show respectively plates 113 and 213 with different cross-sections to aid collapse of the structure. The plate 113 has a collapse structure 114 substantially mid way along the length thereof. The structure has a Z-shaped cross-section, with the cross-bar of the Z extending substantially transversely. The plate 213 has a gently curving S-shape cross-section.

Alternatively, one or more feature(s) such as a small indent could be provided in the plates. Both of these features would encourage collapse or folding of the plates during the autoclaving phase. Also, formations other than incorporating hexagons may be appropriate. For instance, a repeating two level formation providing a square or rectangle in plan view could be provided.

Whilst the above described example uses stereolithography, other manufacturing methods could be used. Whilst the above described example uses stereolithography, other manufacturing methods could be used. For example, solid ground curing could be used. Alternatively, a method using a laser to melt powder particles together is a possibility. As a further alternative, the structure could be formed by extrusion, for instance of a thermoplastic material.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A structure (10) of solid material, the structure (10) comprising a plurality of levels, each level comprising a plurality of spaced plates (13,15,17) of material, the plates each being edge connected to plates of at least one adjacent level, the plates of each level being transverse to the plates of at least one adjacent level, the plates (13,15,17) being arranged such that in plan view edges (12,14,16) of the plates (13,15,17) from a plurality of levels together define a plurality of adjoining polygonal formations, characterized in that the sides of each formation are defined by plates (13,15,17), at least some of which plates (13,15,17) for each formation are in different levels, the plates (13,15,17) having been formed progressively in situ.

2. The structure of claim 1, characterised in that the plates (13,15,17) in adjacent levels are joined to each other by a selected one of their respective edges (12,14,16) and corners.

3. The structure of claim 1, characterised in that the plates (13,15,17) in adjacent levels are joined to each other substantially only by point contact.

4. The structure of claim 1, characterised in that the structure (10) comprises a plurality of levels such that polygonal formations in each level are concentric with respective formations in other levels.

5. The structure of claim 1, characterised in that the polygonal formations comprise substantially regular hexagons.

6. The structure according to claim 5, characterised in that the hexagons are defined by plates (13,15,17) in three levels.

7. The structure according to claim 6, characterised in that each level comprises a plurality of spaced discrete parallel plates (13,15,17).

8. The structure according to claim 7, characterised in that the plates (13,15,17) in each level are offset relative to plates (13,15,17) in adjacent levels by substantially 120°.

9. An object comprising an outer skin within which the structure (10) of claim 1 is contained.

10. The structure according to claim 1, characterised in that the plates (13,15,17) are curved to facilitate bending or collapse thereof.

11. A method of making a structure for use in a lost wax casting process comprising:
 a) solidifying portions of a body of liquid material to provide a first set of spaced plates;
 b) moving the first set into the body to space it from a surface of the body; and,
 c) solidifying further portions to provide at least a second set of plates extending from the first set to the surface with the plates of the second set being above and oriented transversely of the first set and with an edge of each plate of the second set connected to at least one edge of a plate of the first set by a connection which is essentially point contact whereby to form a structure comprised of polygons as seen in a plan view.

12. A method according to claim 11, wherein the solidifying steps are performed by selective curing of a material using electromagnetic radiation.

13. A method according to claim 11, characterised in that the material comprises a thermosetting liquid.

14. A method according to claim 13, characterised in that the structure is formed by stereolithography.

15. A method of producing a mould, by forming a structure according to claim 11 to produce a pattern of an item to be cast, forming a coating around the pattern, and subsequently removing the pattern from within the coating to form a mould.

16. A method according to claim 15, characterised in that the pattern is burnt away from the mould.

17. A method according to claim 16, characterised in that the pattern is burnt away from the mould by flash firing with excess oxygen.

18. A method according to claim 15, characterised in that passage material is provided on the pattern prior to coating to define passages for molten material to be poured into the mould.

19. A method according to claim 18, characterized in that the passage material is wax.

20. A method according to claim 19, characterised in that the removal of the wax is achieved in an autoclave.

21. A method according to claim 20, characterised in that the removal of the wax is achieved by steam autoclaving.

22. A method according to claim 15, characterised in that the coating comprises a ceramic material.

23. A method according to claim 22, characterised in that the ceramic material is applied in a number of layers and is subsequently fired.

24. The process of claim 11, wherein following solidification of the second set the sets are further lowered into the body and a further portions of the liquid material are solidified to form a third set of plates each disposed transversely of and connected to at least one plate of the second set.

25. The process of claim 24, wherein the lowering and solidifying steps are repeated to form at least one still further set of plates.

26. The process of claim 24, wherein the plate connections between the second and third sets are essentially point connections.

27. The process of claim 11, wherein the plate connections are essentially point connections.

28. The process of claim 11, further including the step of elevating the structure above the body and allowing liquid material to drain from the structure into the body.

29. The structure of claim 1, wherein a feature is provided in each of selected ones of the plates to facilitate bending or collapse of the structure.

30. A structure of solid material, the structure comprising a plurality of levels, each level comprising a plurality of spaced plates of material, the plates being arranged such that in plan view edges of the plates define a plurality of adjoining polygonal formations, characterized in that the sides of each formation are defined by plates, at least some of which plates for each formation are in different levels, the plates having been formed progressively in situ and the plates being curved to facilitate bending or collapse of the structure.

31. A structure of solid material, the structure comprising a plurality of levels, each level comprising a plurality of spaced plates of material, the plates being arranged such that in plan view edges of the plates define a plurality of adjoining polygonal formations, characterized in that the sides of each formation are defined by plates, at least some of which plates for each formation are in different levels, the plates having been formed progressively in situ, and a feature being provided with each of selected ones of the plates being provided with a feature to facilitate bending or collapse of the structure.

32. The structure of claim 30, wherein a feature is provided in each of selected ones of the plates to facilitate bending or collapse of the structure.

\* \* \* \* \*